United States Patent
Lambke (10) Patent No.: US 8,939,182 B2
(45) Date of Patent: Jan. 27, 2015

(54) LIQUID COLLECTION SYSTEM

(76) Inventor: Jay Vincent Lambke, Ashburn, VA (US)

(*) Notice: Subject to any disclaimer, the term of this patent is extended or adjusted under 35 U.S.C. 154(b) by 748 days.

(21) Appl. No.: 13/211,017

(22) Filed: Aug. 16, 2011

(65) Prior Publication Data

US 2013/0042919 A1 Feb. 21, 2013

(51) Int. Cl.
*F17D 3/00* (2006.01)
(52) U.S. Cl.
CPC .................................. *F17D 3/00* (2013.01)
USPC .......................................... 141/198; 141/333
(58) Field of Classification Search
CPC ............................................................ F17D 3/00
USPC .............. 141/198, 331, 333, 338; 137/1, 558; 220/908, 909
See application file for complete search history.

(56) References Cited

U.S. PATENT DOCUMENTS

| | | | | |
|---|---|---|---|---|
| 1,618,366 A * | 2/1927 | Culling | 232/1 R |
| 3,451,453 A * | 6/1969 | Heck | 206/390 |
| 4,108,609 A * | 8/1978 | Petzinger | 435/290.1 |
| 4,893,719 A * | 1/1990 | Lombardi et al. | 220/23.4 |
| 4,893,722 A * | 1/1990 | Jones | 220/503 |
| 5,108,000 A * | 4/1992 | Stoll et al. | 220/23.4 |
| 5,172,739 A * | 12/1992 | Ristroph | 141/98 |
| 5,181,619 A * | 1/1993 | Noble | 209/702 |
| 5,251,656 A * | 10/1993 | Sexton, Sr. | 137/1 |
| 5,301,388 A * | 4/1994 | Zeren | 15/327.1 |
| 5,303,841 A * | 4/1994 | Mezey | 220/555 |
| 5,495,941 A * | 3/1996 | Leonard | 206/366 |
| 5,498,395 A * | 3/1996 | Moore et al. | 422/549 |
| 5,843,768 A * | 12/1998 | Lin et al. | 435/290.1 |
| 5,901,689 A | 5/1999 | Kimura et al. | |
| 6,199,714 B1 * | 3/2001 | Thompson | 220/495.07 |
| 6,263,916 B1 * | 7/2001 | Rumpf | 137/558 |
| 6,453,955 B1 * | 9/2002 | Lee | 141/198 |
| 6,684,902 B1 * | 2/2004 | Zinn et al. | 137/393 |
| 6,752,183 B2 * | 6/2004 | Leoncavallo | 141/340 |
| 7,487,100 B2 * | 2/2009 | Mallett et al. | 705/308 |
| 7,575,022 B2 * | 8/2009 | Higgins | 137/558 |
| 7,603,901 B1 | 10/2009 | Tai | |
| 7,621,898 B2 * | 11/2009 | Lalomia et al. | 604/319 |
| 8,544,673 B1 * | 10/2013 | Polk | 220/495.09 |
| 2002/0095125 A1 * | 7/2002 | Parker | 604/327 |
| 2003/0226773 A1 * | 12/2003 | Shaffer | 206/204 |
| 2008/0184484 A1 * | 8/2008 | Webster | 4/679 |
| 2009/0283491 A1 * | 11/2009 | Wang | 215/6 |
| 2010/0031744 A1 | 2/2010 | Tai | |
| 2011/0056952 A1 * | 3/2011 | Borowski et al. | 220/495.06 |
| 2012/0078539 A1 * | 3/2012 | Vernon-Harcourt et al. | 702/50 |
| 2013/0042919 A1 * | 2/2013 | Lambke | 137/1 |

* cited by examiner

*Primary Examiner* — Jason K Niesz
*Assistant Examiner* — Andrew Schmid
(74) *Attorney, Agent, or Firm* — August Law, LLC; George A. Willinghan, III (57) ABSTRACT

A liquid collection system includes a liquid collection portion configured to attach to a waste receptacle having a waste receptacle opening. The liquid collection portion has a liquid collection opening which extends into the waste receptacle opening. The liquid container also has a liquid reservoir portion attached to the liquid collection portion and in communication with the liquid collection opening. A fill indicator is in communication with the liquid container. The fill indicator is configured to indicate when an amount of liquid in the liquid reservoir portion has a predetermined volume.

20 Claims, 6 Drawing Sheets

LIQUID COLLECTION SYSTEM

FIELD OF THE INVENTION

The present invention is directed to systems for collecting liquids.

BACKGROUND OF THE INVENTION

In many establishments, waste liquids are often disposed of in traditional waste receptacles, including trash cans and trash bags. These traditional waste receptacles are not intended to hold liquids. Therefore, the disposal of liquids into these receptacles causes issues including leakage, unattractive smells and unsanitary conditions. Additionally, the weight of liquids disposed in a traditional waste receptacle makes transporting the waste receptacle difficult.

Separate containers for the disposal of liquids only are not provided in conjunction with traditional waste receptacles, and these waste receptacles are not located adjacent to plumbing or drains. Therefore, a need exists for a liquid container that can be used for liquid collection adjacent to a solid waste receptacle.

SUMMARY OF THE INVENTION

Exemplary embodiments in accordance with the present invention are directed to methods and systems that provide a liquid collection system in association with a waste receptacle. A liquid collection system a liquid collection portion having a liquid collection opening which extends into a waste receptacle opening. In one embodiment, the liquid collection portion is located in an aperture. In another embodiment, the aperture is located adjacent to the waste receptacle opening. The liquid container also has a liquid reservoir portion attached to the liquid collection portion and in communication with the liquid collection opening. A fill indicator is in communication with the liquid container. The fill indicator is configured to indicate when an amount of liquid in the liquid reservoir portion has a predetermined volume.

In one embodiment, the liquid collection portion is attached to the waste receptacle. In another embodiment the liquid reservoir portion is releasably mounted to the liquid collection portion. In yet another embodiment, the waste receptacle opening has a waste receptacle opening area, the liquid collection opening has a liquid collection area, and the liquid collection opening is disposed within the waste receptacle opening. In one embodiment, the liquid collection opening area is less than the waste receptacle opening area.

In one embodiment, the liquid collection portion includes a liquid discharge opening and a conduit which extends between the liquid collection opening and the liquid discharge opening. The liquid reservoir portion is in communication with the liquid discharge opening. In another embodiment, the liquid collection portion has a screen disposed in at least one of the liquid collection opening, the conduit or the liquid discharge opening. In yet another embodiment, the liquid reservoir portion is an expandable container with an expandable volume.

A fill indicator is also provided. The fill indicator indicates when an amount of liquid reservoir portion has a predetermined volume. In one embodiment, the fill indicator includes a weight sensitive mechanism configured to respond to a weight associated with the predetermined volume. In another embodiment, the liquid reservoir portion is a rigid container with a fixed capacity. In yet another embodiment, the fill indicator includes a float switch disposed in the rigid container. The float switch has a first portion corresponding to a first liquid level representing a first volume that is less than the predetermined volume, and a second position corresponding to a second liquid level representing a second volume that is greater than or equal to the predetermined volume. The fill indicator is configured to indicate when the float switch is in the second position.

In one embodiment, the waste receptacle is a trash can. In another embodiment, the waste receptacle opening includes a hole in a countertop and the liquid container is mounted to the countertop adjacent the hole. In another embodiment, the fill indicator includes at least one of a visual indicator, or an audible indicator. In yet another embodiment, a remote fill indicator is provided. The remote fill indicator is in communication with and separate from the fill indicator. The remote fill indicator is configured to communicate the indication of when the amount of liquid includes the predetermined volume of a location remote from the liquid container.

In one embodiment, the remote fill indicator includes at least one of a visual indicator, an audible indicator, or a wireless communication system. In another embodiment, the liquid collection system includes an overflow mechanism in communication with the liquid container and the waste receptacle. The overflow mechanism is configured to direct liquid to the waste receptacle when the amount of liquid in the liquid reservoir portion exceeds a maximum volume, where the maximum volume is greater than the predetermined volume. In one embodiment, the liquid collection system includes a closure mechanism disposed between the liquid collection portion and the liquid reservoir portion. The closure mechanism is configured to prevent the flow of liquid from into the liquid reservoir portion when the amount of liquid exceeds the predetermined volume.

Exemplary embodiments in accordance with the present invention are also directed to a method for collecting liquids at a solid waste receptacle. In accordance with this method a liquid collection portion of a liquid container is associated with a waste receptacle opening of a solid waste receptacle. Liquids are directed from the liquid collection portion to a liquid reservoir portion of the liquid container. An amount of liquid in the liquid collection portion is monitored. In one embodiment, when the amount of liquid in the liquid reservoir portion has a predetermined volume, an indication is made. The liquid reservoir portion is removed from the liquid collection portion upon indication that the amount of liquid is at the predetermine volume. A liquid is disposed in the liquid reservoir portion.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION

Figure 1:
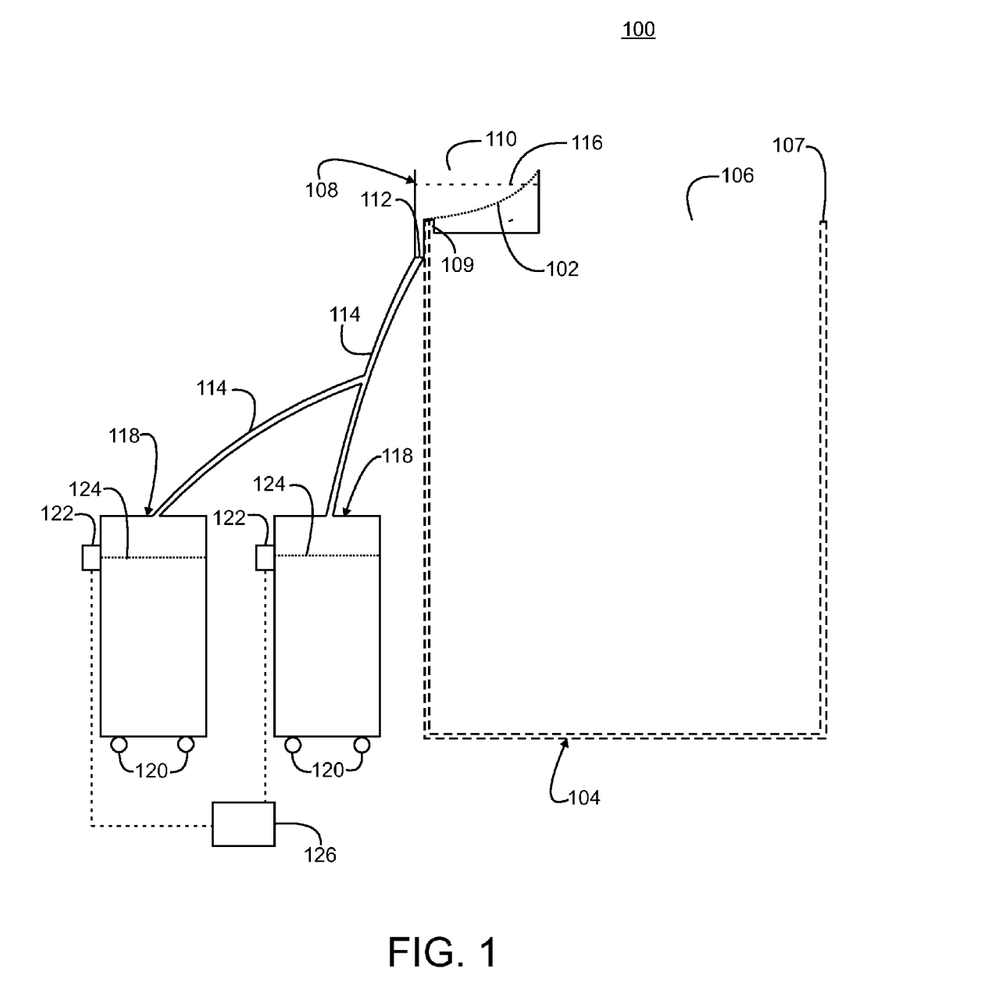
FIG. 1 is a schematic representation of an embodiment of a liquid collection system in accordance with the present invention.

Exemplary embodiments of a liquid collection system in accordance with the present invention associate the liquid collection system with an existing waste receptacle to collect liquids that are typically poured into that waste receptacle. Referring initially to FIG. 1, an exemplary embodiment of a liquid collection system 100 in accordance with the present invention is illustrated. The liquid collection system is generally arranged as a liquid container attached to an existing waste receptacle 104 that is configured to accept solid waste or trash. Suitable waste receptacles include, but are not limited to, trash cans, waste baskets, garbage cans, buckets, trash bags, dumpsters and holes or openings in countertops. The waste receptacles can be constructed from a variety of materials including, but not limited to stainless steel, metal, galvanized, fiberglass, aluminum, concrete, precast, aggregate, stone, laminates and plastic. As illustrated in FIG. 1, the liquid collection system is being used with a trash can type waste receptacle. However, the liquid collection system of the present invention is not limited to use with trash cans or trash can type waste receptacles. In general, each type of waste receptacle includes a waste receptacle opening 106 sized and having a waste receptacle opening area sufficient to accommodate the size and amount of trash to be placed in the waste receptacle. Suitable shapes for the waste receptacle opening include but are not limited to circles, ovals, rectangles and squares.

The liquid collection system includes a liquid collection portion 108 and a liquid reservoir portion 118 attached to the liquid collection portion. At least one of the liquid collection portion and the liquid reservoir portion is attached to the waste receptacle. In one embodiment, the liquid collection portion 108 is attached to the waste receptacle 104. Suitable attachment mechanisms include but are not limited to fasteners such as bolts and screws, hooks, magnets, adhesives, and clamps. In one embodiment as illustrated in FIG. 1, the liquid collection portion includes a slot 109 shaped to accommodate the size, shape and thickness of a rim or lip 107 that defines the opening 106 of the waste receptacle. Therefore, the liquid collection portion slides over or hooks to the rim of the waste receptacle. The liquid collection portion 108 can also include additional fasteners or clamps adjacent to slot to secure the liquid collection portion to the waste receptacle after the slot is placed over the rim.

The liquid collection portion includes a liquid collection opening 110 sized and configured to accept liquids poured into the liquid collection portion. In one embodiment, the liquid collection opening 110 extends at least partially across and into the waste receptacle opening 106. The liquid collection opening extends sufficiently across the waste receptacle opening to provide for the collection of liquids without inhibiting the disposal of trash into the trash receptacle. The liquid collection portion 108 includes a liquid discharge opening 112 in communication with the liquid collection opening 110. In one embodiment, the liquid collection portion includes an internal surface 102 shaped to direct liquid smoothly from the liquid collection opening to the liquid discharge opening. Suitable shapes for the internal surface include funnels or other configurations of sloped or slanted surfaces.

The liquid discharge opening is also in communication with the liquid reservoir portion 118. In one embodiment, the liquid discharge opening is in direction communication or contact with the liquid reservoir portion. Alternatively, the liquid collection system includes a conduit 114 in communication with and extending between the liquid discharge opening 112 and the liquid reservoir portion 118. Suitable conduits include, but are not limited to, tubes and pipes. Suitable materials for the conduit include, but are not limited to, plastics, e.g. polyvinyl chloride (PVC), rubbers and metals, e.g., copper.

In one embodiment, the liquid collection system includes a screen 116 configured to prevent solids greater than a predetermined size from passing through the liquid collection portion and into the liquid reservoir portion. The screen can be fixedly or removeably attached to the liquid collection system. Suitable screens include, but are not limited to, metal wire mesh screens and plastic screens. The screen can be located in the liquid collection portion across the liquid collection opening 110 or the liquid discharge opening 112, can be disposed between the liquid collection opening and the liquid discharge opening or can be located in the conduit 114. In one embodiment, the liquid collection system includes a plurality of screens located along the path of liquid flow through the liquid collection system. The screens in the plurality of screens can all have the same mesh size or can each have a different mesh size. For example, the mesh size of the screens can decrease along the fluid path through the liquid collection system.

The liquid reservoir portion 118 is in communication with the liquid collection liquid collection portion 108. As illustrated, the liquid reservoir portion is in communication with the liquid collection portion through a conduit, and the liquid reservoir portion rests on the floor or other surface, which supports the weight of the liquid reservoir portion. In one embodiment, the liquid reservoir portion includes coaster or wheels 120 to facilitate moving of the liquid reservoir portion for cleaning or disposal of the liquids within the liquid reservoir portion. In one embodiment, the liquid reservoir portion is attached directly to the liquid collection portion and is supported by the liquid collection portion. This attachment can be a releasable attachment. In one embodiment, the liquid reservoir portion is attached to or mounted to the waste receptacle. and in communication with the liquid collection opening 112. Suitable mounting mechanisms for mounting the liquid reservoir portion to the liquid collection portion or the waste receptacle include, but are not limited to, fasteners such as bolts and screws, magnets, adhesives and clamps.

In one embodiment, the liquid collection system 100 includes a plurality of liquid reservoir portions 118, e.g., two or more liquid reservoir portions. Each liquid reservoir portion is in communication with the liquid collection system either directly in communication with the liquid collection opening or through one or more conduits 114. The liquid collection system can be configured to divide the collection liquid among the plurality of liquid reservoir portions, filling all of the liquid reservoir portions simultaneously. Alternatively, one liquid reservoir portion can be filled at a time, and the collected liquid is directed to another liquid reservoir portion after the first liquid reservoir portion is full, using, for example, an arrangement of valves and conduits. Therefore, the liquid collection system can be used continuously, as one liquid reservoir portion can be used while another liquid reservoir portion is being emptied.

Suitable liquid reservoir portions include rigid container having a fixed capacity and flexible or expandable containers such as expandable bladders. Suitable rigid containers include, but are not limited to, tanks, bottles, cans and drums. Suitable materials for liquid reservoir portion include, but are not limited to, plastic, rubber and metal.

The liquid collection system 100 includes at least one fill indicator 122. In one embodiment, a fill indicator is provided in communication with each liquid reservoir portion. The fill indicator is configured to detect when an amount of liquid in the liquid reservoir portion 118 has a predetermined volume 124 and to provide an indication or notification that the predetermined volume exists in the liquid reservoir portion. In one embodiment, the predetermined volume is selected to be less than the capacity of the liquid reservoir portion. Therefore, the fill indicator includes a sensor mechanism to monitor the volume of liquid in the liquid reservoir portion and a notification mechanism to communicate or to indicate when the predetermined volume is achieved. Suitable sensor mechanisms include, but are not limited to, float sensors, ultrasonic sensors, optical sensors, hydrostatic sensors, weight-based sensors and radar sensors. Suitable notification mechanisms include, but are not limited to, visual notification mechanisms such as lights and audible notification mechanisms. Suitable visual notification mechanisms include, but are not limited to, lights, light emitting diodes, a screen with a textual readout and combinations thereof.

In one embodiment, the liquid collection system is configured to communicate an indication of when the amount of liquid is at the predetermined volume at a location remote from the liquid collection portion and the liquid reservoir portion. In one embodiment, the liquid collection system includes at least one a remote fill indicator 126 in communication with each fill indicator. Suitable locations for the remote fill indicator include, but are not limited to on at least one computer system, on at least one phone, and on or adjacent to a cash register. The remote fill indicator includes at least one of a visual indicator, an audible indicator and a wireless communication system. Suitable visual indicators for the remote fill indicator include, but are not limited to, lights, light emitting diodes, a screen with a textual readout and combinations thereof. Suitable audible indicators for the remote fill indicator include, but are not limited to, speakers.

Figure 2:
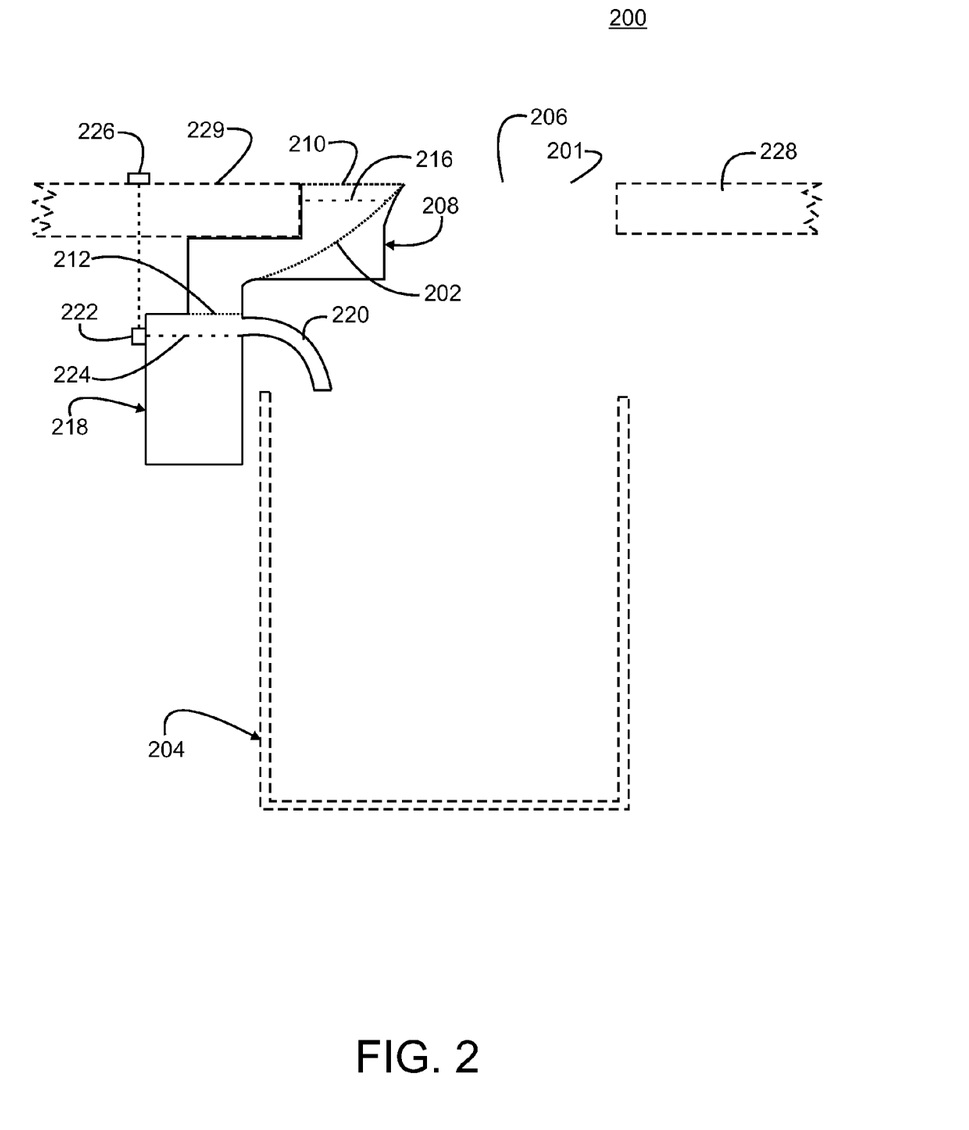
FIG. 2 is a schematic representation of another embodiment of the liquid collection system disposed in a countertop.

Referring to FIG. 2, another embodiment of the liquid collection system 200 in accordance with the present invention is illustrated. In this embodiment, the liquid collection system 200 is configured to work with and be attached to a waste receptacle that is configured as a hole 201 in a countertop 228 with a waste basket 204 located below the hole. The liquid collection system 200 includes the liquid collection portion 208 and the liquid reservoir portion 218 attached to the liquid collection portion. The liquid collection portion 208 is attached to the underside of the countertop adjacent the hole 201. Suitable attachment mechanisms include but are not limited to fasteners such as bolts and screws, hooks, magnets, adhesives, and clamps.

Figure 3:
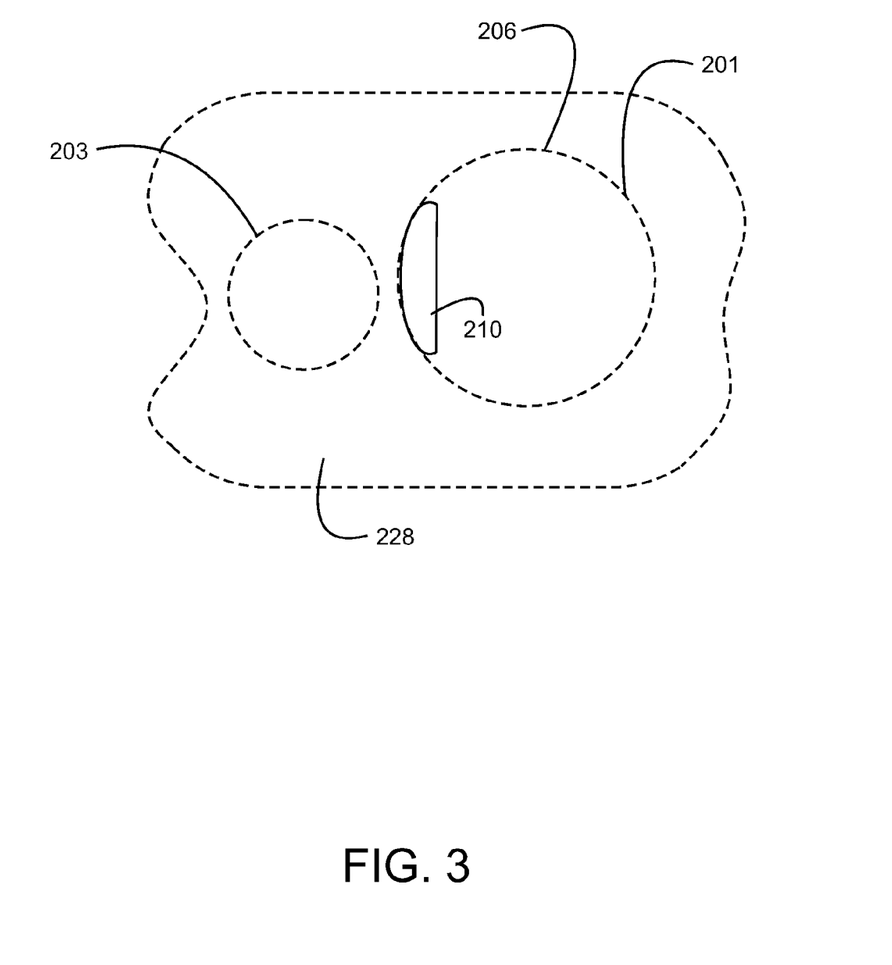
FIG. 3 is a plan view illustrating the overlap of the liquid collection portion of the liquid collection system and an opening of the waster receptacle.

The liquid collection portion includes a liquid collection opening 210 sized and configured to accept liquids poured into the liquid collection portion. In one embodiment, the liquid collection opening 210 extends at least partially across and into the hole 201 in the counter top. In addition, the liquid collection portion extends up through the counter top hole such that the liquid collection opening 210 is even with the top side 229 of the countertop. As illustrated in FIG. 3, the hole in the counter top 201 is the waste receptacle opening 206 and it has a waste receptacle opening area, i.e., a given size. The liquid collection opening 210 has a liquid collection opening area that is less than the waste receptacle opening area. Therefore, the liquid collection opening only occupies a portion of the countertop hole 206. In another embodiment, the liquid collection opening area is less than the waste receptacle opening area. In yet another embodiment, the liquid collection portion is located in an aperture 203. In one embodiment, the aperture is located adjacent to the waste receptacle opening. In another embodiment, the liquid collection portion 208 is separate from and does not overlap the waste receptacle.

Returning back to FIG. 2, the liquid collection portion 208 includes a liquid discharge opening 212 in communication with the liquid collection opening 210. In one embodiment, the liquid collection portion includes an internal surface 202 shaped to direct liquid smoothly from the liquid collection opening to the liquid discharge opening. Suitable shapes for the internal surface include funnels or other configurations of sloped or slanted surfaces.

The liquid discharge opening is also in communication with the liquid reservoir portion 218. As illustrated, the liquid discharge opening is in direct communication or contact with the liquid reservoir portion. The liquid reservoir portion is releasably attached to the liquid discharge opening so that the liquid reservoir portion can be removed to empty the collected liquid. Suitable mounting mechanisms for mounting the liquid reservoir portion to the liquid collection portion include, but are not limited to, fasteners such as bolts and screws, magnets, adhesives and clamps.

In one embodiment, the liquid collection system includes a screen 216 configured to prevent solids greater than a predetermined size from passing through the liquid collection portion and into the liquid reservoir portion. The screen can be fixedly or removeably attached to the liquid collection system. Suitable screens include, but are not limited to, metal wire mesh screens and plastic screens. The screen can be located in the liquid collection portion across the liquid collection opening 210 or the liquid discharge opening 212 can be disposed between the liquid collection opening and the liquid discharge opening. In one embodiment, the liquid collection system includes a plurality of screens located along the path of liquid flow through the liquid collection system. The screens in the plurality of screens can all have the same mesh size or can each have a different mesh size. For example, the mesh size of the screens can decrease along the fluid path through the liquid collection system.

Suitable liquid reservoir portions include rigid container having a fixed capacity and flexible or expandable containers such as expandable bladders. Suitable rigid containers include, but are not limited to, tanks, bottles, cans and drums. Suitable materials for liquid reservoir portion include, but are not limited to, plastic, rubber and metal.

The liquid collection system 200 includes at least one fill indicator 222. In one embodiment, a fill indicator is provided in communication with the liquid reservoir portion. The fill indicator is configured to detect when an amount of liquid in the liquid reservoir portion 218 has a predetermined volume 224 and to provide an indication or notification that the predetermined volume exists in the liquid reservoir portion. In one embodiment, the predetermined volume is selected to be less than the capacity of the liquid reservoir portion. Therefore, the fill indicator includes a sensor mechanism to monitor the volume of liquid in the liquid reservoir portion and a notification mechanism to communicate or to indicate when the predetermined volume is achieved. Suitable sensor mechanisms include, but are not limited to, float sensors, ultrasonic sensors, optical sensors, hydrostatic sensors, weight-based sensors and radar sensors. Suitable notification mechanisms include, but are not limited to, visual notification mechanisms such as lights and audible notification mechanisms. Suitable visual notification mechanisms include, but are not limited to, lights, light emitting diodes, a screen with a textual readout and combinations thereof.

In one embodiment, the liquid collection system is configured to communicate an indication of when the amount of liquid is at the predetermined volume at a location remote from the liquid collection portion and the liquid reservoir portion. In one embodiment, the liquid collection system includes at least one a remote fill indicator 226 in communication with each fill indicator. Suitable locations for the remote fill indicator include, but are not limited to on at least one computer system, on at least one phone, adjacent a cash register and on the top surface 229 of the countertop 228. The remote fill indicator includes at least one of a visual indicator, an audible indicator and a wireless communication system. Suitable visual indicators for the remote fill indicator include, but are not limited to, lights, light emitting diodes, a screen with a textual readout and combinations thereof. Suitable audible indicators for the remote fill indicator include, but are not limited to, speakers. In one embodiment, the remote fill indicator is a light on the top side of the countertop.

In one embodiment, the liquid collection system includes an overflow mechanism 220 in communication with at least one of the liquid collection portion 208 and the liquid reservoir portion 218. The overflow mechanism 220 is configured to direct liquid to the waste basket 204 portion of the waste receptacle when the amount of liquid in the reservoir portion exceeds a maximum volume, which is greater than a predetermined volume 224. Suitable overflow mechanisms include, but are not limited to, drainage tubes, drainage holes and liquid pumps. In one embodiment, the overflow mechanism 220 is configured to direct liquid to the waste basket 204 while a liquid reservoir portion 218 is detached from the liquid collection portion 208.

Figure 4:
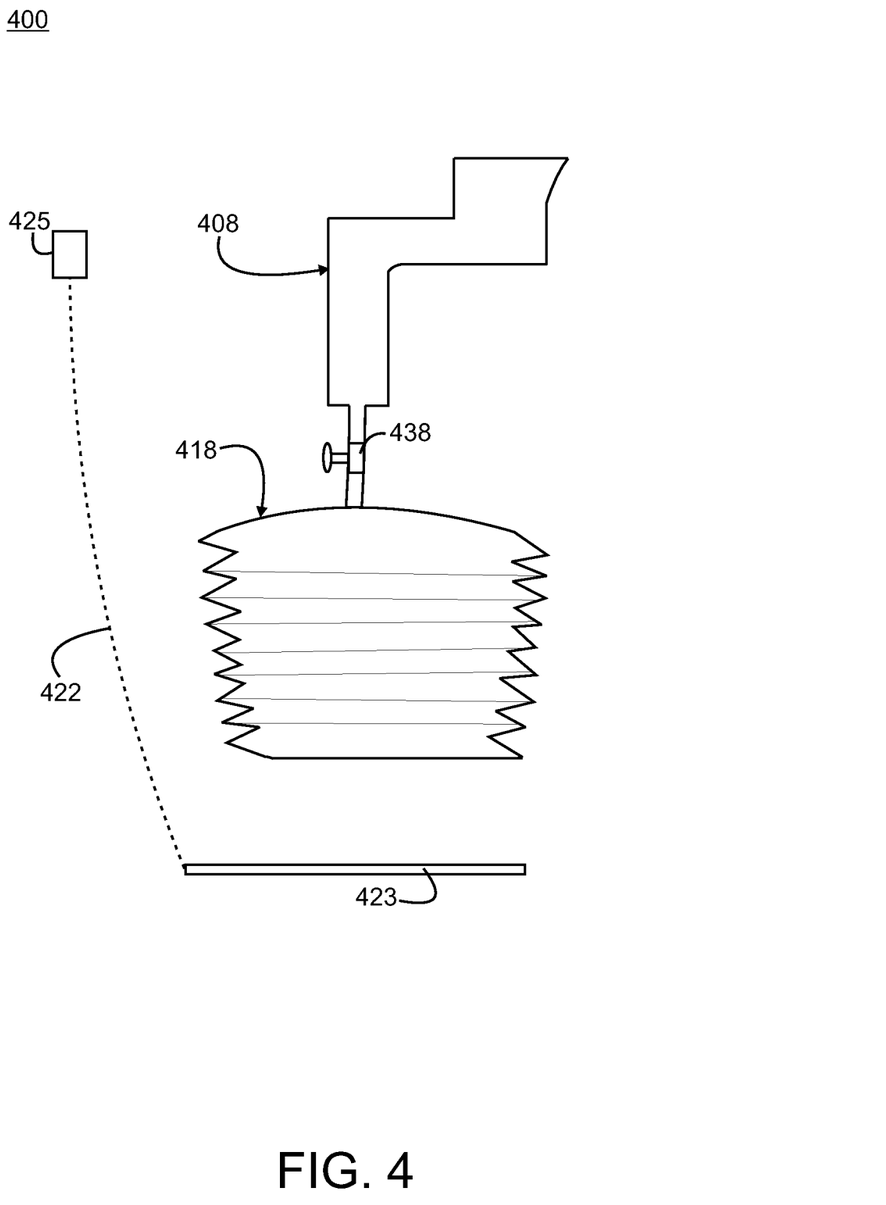
FIG. 4 is a schematic representation of another embodiment of the liquid collection system with an expandable bladder as the liquid reservoir portion.

Referring to FIG. 4, another exemplary embodiment of a liquid collection system 400 in accordance with the present invention is illustrated. In this embodiment, the liquid reservoir portion 418 is in communication with the liquid collection portion 408 and the liquid collection portion 408 is an expandable container having an expandable volume. Suitable expandable containers include, but are not limited to, plastics, polymers and bladders made of an elastomeric material including rubber. In one embodiment, the liquid collection system 400 includes a closure mechanism 438 disposed between the liquid collection portion 408 and the liquid reservoir portion 418. The closure mechanism 438 is configured to prevent the flow of liquid from the liquid collection portion 408 into the liquid reservoir portion 418 when the closure mechanism is placed in a closed position and the liquid reservoir portion is removed from the liquid collection portion. Suitable closure mechanisms include, but are not limited to, valves and stoppers. In one embodiment, the closure mechanism 438 is a diverter valve (not shown) configured to direct liquid to the waste receptacle while the liquid reservoir portion 418 is detached from the liquid collection portion 408.

The liquid collection system 400 includes a fill indicator 422. In one embodiment, the fill indicator includes a pressure sensitive plate 423 positioned below and adjacent the expandable bladder. The fill indicator also includes an indicator 425 in communication with the pressure sensitive plate. As the expandable bladder fills with liquid, the bladder expands, eventually contacting the pressure sensitive plate when the volume of liquid in the expandable bladder equals the predetermined volume. This energizes the indicator 425 to provide a visual or audible indication. In one embodiment, the fill indicator uses a weight sensitive mechanism instead of the pressure sensitive plate. The weight sensitive mechanism is in communication with the expandable bladder, monitoring the weight of liquid within the bladder. The weight sensitive mechanism is configured to respond to a weight associated with the predetermined volume. Suitable weight sensitive mechanisms include, but are not limited to, scales, strain gauges, capacitive diaphragms, electromagnetic diaphragms, piezoelectric components, and optical devices. In another embodiment, the liquid collection portion 408 is separate from and does not overlap a waste receptacle.

Figure 5:
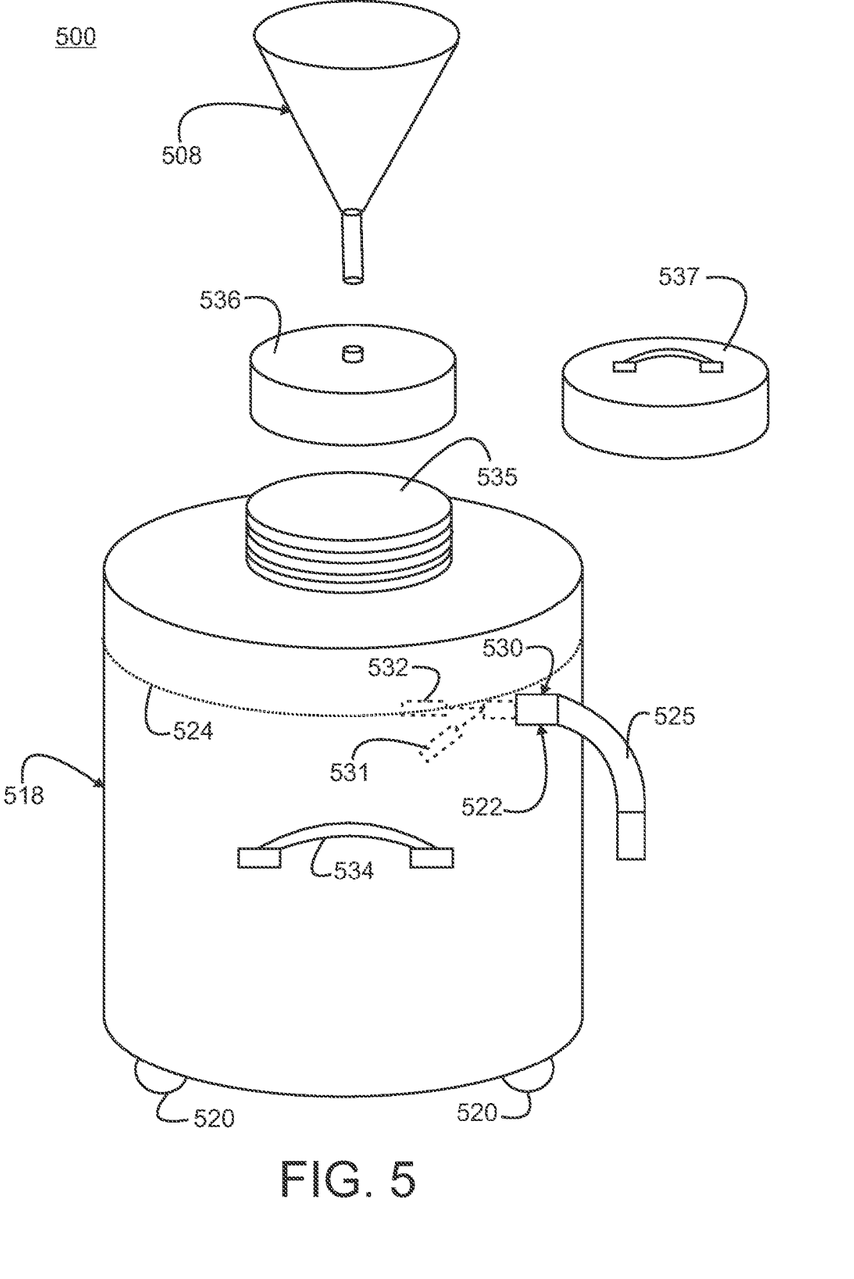
FIG. 5 is a view of another embodiment of the liquid collection system in accordance with the present invention.

Referring to FIG. 5, another exemplary embodiment of a liquid collection system 500 in accordance with the present invention is illustrated. In this embodiment, the liquid reservoir portion 518 is in communication with the liquid collection portion 508. In one embodiment, the liquid reservoir portion 518 includes a plurality of wheels 520 for ease of transport of the liquid reservoir portion. In another embodiment, the liquid reservoir portion includes at least one handle 534 attached to the liquid reservoir portion 518. Preferably, at least two handles 534 are provided for ease of transport of the liquid reservoir portion. In one embodiment, the liquid reservoir portion 518 includes a threaded mouth 535. In another embodiment, the liquid collection system 500 includes a threaded cap 536 disposed between the liquid collection portion 508 and the liquid reservoir portion 518. Suitable materials for the threaded cap include, but are not limited to, plastics, rubbers and metals. In one embodiment, the threaded cap is detachable from the threaded mouth 535 of the liquid reservoir portion. In another embodiment, the liquid reservoir portion includes a threaded handle 537. In one embodiment, the threaded handle is detachable from the threaded mouth 535 of the liquid collection portion. The threaded handle is used to ease transport of the liquid reservoir portion.

The liquid collection system 500 includes a fill indicator 522. In one embodiment, the fill indicator is a float switch 530 disposed in the liquid reservoir portion. The float switch 530 has a first position 531 corresponding to a first liquid level. In one embodiment, the first liquid level represents a first volume that is less than the predetermined volume 524. The float switch also has a second position 532 corresponding to a second liquid level. In one embodiment, the second liquid level represents a second volume that is greater or equal to the predetermined volume 524. The fill indicator also includes an indicator 525 in communication with the float switch 530. In one embodiment, when the volume of liquid in the liquid collection portion 518 equals the predetermined volume the float switch 530 moves from the first position 531 to the second position 532. This energizes the indicator 525 to provide a visual or audible indication. Suitable visual indicators include, but are not limited to, lights, light emitting diodes, a screen with a textual readout, and combinations thereof. Suitable audible indicators include, but are not limited to, speakers. In one embodiment, the visual or audible indicator is removeably tethered to the liquid reservoir portion. In another embodiment, the liquid collection portion 508 is separate from and does not overlap a waste receptacle.

Figure 6:
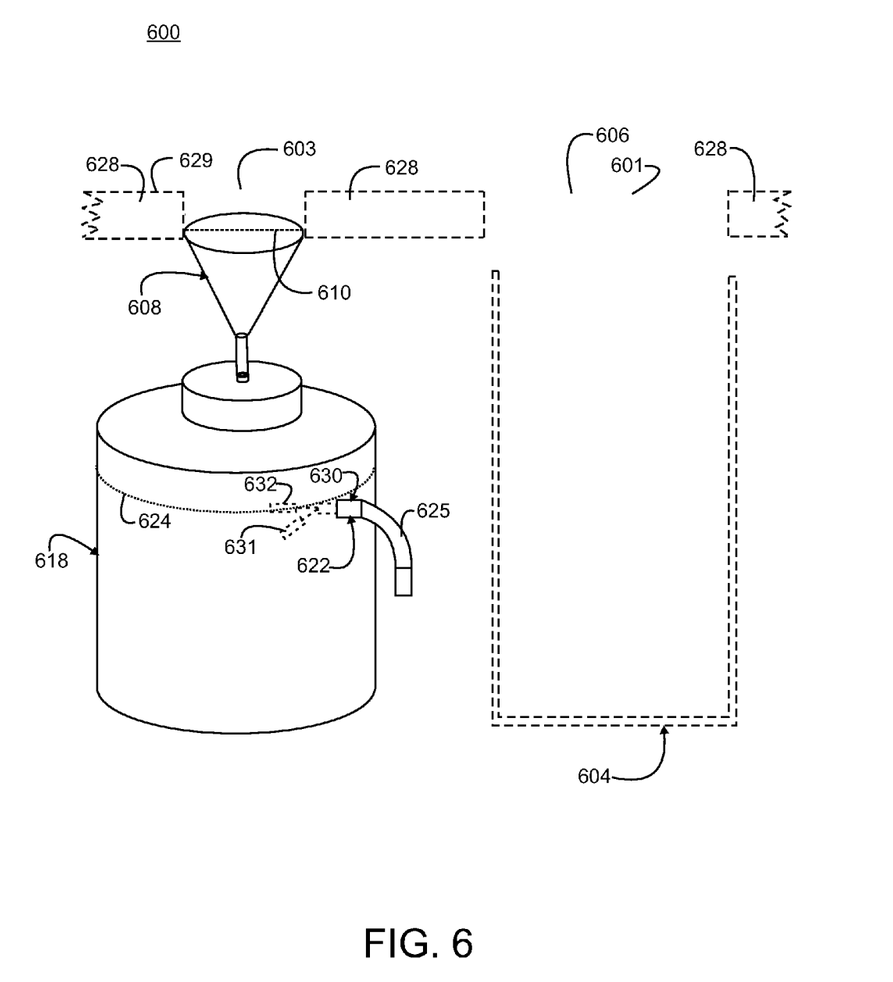
FIG. 6 is a view of another embodiment of the liquid collection system in accordance with the present invention.

Referring to FIG. 6, another exemplary embodiment of a liquid collection system 600 in accordance with the present invention is illustrated. In this embodiment, the liquid collection system 600 is configured to work with and be attached to an aperture 603 in a countertop 628. In another embodiment, the aperture 603 is located adjacent to a hole in the counter top 601. In yet another embodiment the hole in the countertop is a waste receptacle opening 606 with a waste basket 604 located below the hole. The liquid collection system 600 includes the liquid collection portion 608 and the liquid reservoir portion 618 attached to the liquid collection portion. In one embodiment, the liquid collection portion 608 is attached to the underside of the countertop adjacent the aperture 603. Suitable attachment mechanisms include but are not limited to fasteners such as bolts and screws, hooks, magnets, adhesives, and clamps.

The liquid collection portion includes a liquid collection opening 610 sized and configured to accept liquids poured into the liquid collection portion. In one embodiment, the liquid collection opening 610 extends at least partially across and into the aperture 603 in the counter top. In addition, in one embodiment, the liquid collection portion extends up through the counter top aperture such that the liquid collection opening 610 is even with the top side 629 of the countertop.

The liquid collection system 600 includes a fill indicator 622. In one embodiment, the fill indicator is a float switch 630 disposed in the liquid reservoir portion. The float switch 630 has a first position 631 corresponding to a first liquid level. In one embodiment, the first liquid level represents a first volume that is less than the predetermined volume 624. The float switch also has a second position 632 corresponding to a second liquid level. In one embodiment, the second liquid level represents a second volume that is greater or equal to the predetermined volume 624. The fill indicator also includes an indicator 625 in communication with the float switch 630. In one embodiment, when the volume of liquid in the liquid collection portion 618 equals the predetermined volume the float switch 630 moves from the first position 631 to the second position 632. This energizes the indicator 625 to provide a visual or audible indication. Suitable visual indicators include, but are not limited to, lights, light emitting diodes, a screen with a textual readout, and combinations thereof. Suitable audible indicators include, but are not limited to, speakers. In one embodiment, the visual or audible indicator is removeably tethered to the liquid reservoir portion.

Exemplary embodiments in accordance with the present invention are also directed to a method for collecting liquids at a solid waste receptacle. In accordance with this method a liquid collection portion of a liquid container is associated with a waste receptacle opening of a solid waste receptacle. Liquids are directed from the liquid collection portion to a liquid reservoir portion of the liquid container. An amount of liquid in the liquid collection portion is monitored. In one embodiment, when the amount of liquid in the liquid reservoir portion has a predetermined volume, an indication is made. The liquid reservoir portion is removed from the liquid collection portion upon indication that the amount of liquid is at the predetermine volume. A liquid is disposed in the liquid reservoir portion.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A liquid collection system comprising:
a liquid collection portion configured to attach to an existing waste receptacle comprising a waste receptacle opening, the liquid collection portion separate from and independent of the waste receptacle and comprising a liquid collection opening that is separate from and independent of the waste receptacle opening, the liquid collection opening extending into the waste receptacle opening; and
a liquid reservoir portion attached to the liquid collection portion and in communication with the liquid collection opening; and
a fill indicator in communication with at least one of the liquid collection portion and the liquid reservoir portion, the fill indicator configured to indicate when an amount of liquid in the liquid reservoir portion comprises a predetermined volume.

2. The liquid collection system of claim 1, wherein the liquid collection portion is attached to the waste receptacle and the liquid reservoir portion is releasably mounted to the liquid collection portion.

3. The liquid collection system of claim 1, wherein:
the waste receptacle opening comprises a waste receptacle opening area; and
the liquid collection opening comprises a liquid collection opening area;
wherein the liquid collection opening is disposed within the waste receptacle opening and the liquid collection opening area is less than the waste receptacle opening area.

4. The liquid collection system of claim 1, wherein the liquid collection portion further comprises:
a liquid discharge opening in communication with and separate from the liquid collection opening; and
a conduit extending between the liquid collection opening and the liquid discharge opening and the liquid reservoir portion;
wherein the liquid reservoir portion is in communication with the liquid discharge opening through the conduit.

5. The liquid collection system of claim 4, wherein the liquid collection portion further comprises a screen disposed in at least one of the liquid collection opening, the conduit and the liquid discharge opening.

6. The liquid collection system of claim 1, wherein the liquid reservoir portion comprises an expandable container comprising an expandable volume.

7. The liquid collection system of claim 6, wherein the fill indicator further comprises a weight sensitive mechanism configured to respond to a weight associated with the predetermined volume.

8. The liquid collection system of claim 1, wherein the liquid reservoir portion comprises a rigid container comprising a fixed capacity.

9. The liquid collection system of claim 8, wherein the fill indicator further comprises a float switch disposed in the rigid container, the float switch comprising a first position corresponding to a first liquid level representing a first volume that is less than the predetermined volume and a second position corresponding to a second liquid level representing a second volume that is greater than or equal to the predetermined volume, the fill indicator configured to indicate when the float switch is in the second position.

10. The liquid collection system of claim 1, wherein the waste receptacle comprises a trash can.

11. The liquid collection system of claim 1, wherein the waste receptacle opening comprises a hole in a countertop, the liquid collection portion mounted to the countertop adjacent the hole.

12. The liquid collection system of claim 1, wherein the fill indicator comprises at least one of a visual indicator and an audible indicator.

13. The liquid collection system of claim 1, further comprising a remote fill indicator in communication with and separate from the fill indicator, the remote fill indicator configured to communicate the indication of when the amount of liquid comprises the predetermined volume at a location remote from the liquid collection portion and the liquid reservoir portion.

14. The liquid collection system of claim 13, wherein the remote fill indicator comprises at least one of a visual indicator, an audible indicator and a wireless communication system.

15. The liquid collection system of claim 1, further comprising an overflow mechanism in communication with the waste receptacle and at least one of the liquid collection portion and the liquid reservoir portion, the overflow mechanism configured to direct liquid to the waste receptacle when the amount of liquid in the reservoir portion exceeds a maximum volume, the maximum volume greater than the predetermined volume.

16. The liquid collection system of claim 1, further comprising a closure mechanism disposed between the liquid collection portion and the liquid reservoir portion, the closure mechanism configured to prevent flow of liquid into the liquid reservoir portion when the amount of liquid exceeds the predetermined volume.

17. A liquid collection system comprising:
- a liquid collection portion attached to an existing solid waste receptacle comprising a waste receptacle opening having a waste receptacle opening area, the liquid collection portion separate from and independent of the waste receptacle and comprising a liquid collection opening that is disposed in the waste receptacle opening, the liquid collection opening separate from and independent of the waste receptacle opening and having a liquid collection opening area, the liquid collection opening area less than the waste receptacle opening area;
- a liquid reservoir portion releasably attached to the liquid collection portion in communication with the liquid collection opening; and
- a fill indicator in communication with at least one of the liquid collection portion and the liquid reservoir portion, the fill indicator configured to indicate when an amount of liquid in the liquid reservoir portion comprises a predetermined volume, the fill indicator comprising at least one of a visual indicator and an audible indicator.

18. The liquid collection system of claim 17, wherein:
the liquid reservoir portion comprises an expandable container comprising an expandable volume; and
the fill indicator further comprises a weight sensitive mechanism configured to respond to a weight associated with the predetermined volume.

19. The liquid collection system of claim 17, wherein:
the liquid reservoir portion comprises a rigid container comprising a set capacity; and
the fill indicator further comprises a float switch disposed in the rigid container,
the float switch comprising a first position corresponding to a first liquid level representing a first volume that is less than the predetermined volume and a second position corresponding to a second liquid level representing a second volume that is greater than or equal to the predetermined volume, the fill indicator configured to indicate when the float switch is in the second position.

20. A method for collecting liquids at a solid waste receptacle, the method comprising:
associating a liquid collection portion with a waste receptacle opening of an existing solid waste receptacle, the liquid collection portion separate from and independent of the waste receptacle and waste receptacle opening;
directing liquids from the liquid collection portion to a liquid reservoir portion;
monitoring an amount of liquid in the liquid reservoir portion;
indicating when the amount of liquid in the liquid reservoir portion comprises a predetermined volume;
removing the liquid reservoir portion from the liquid collection portion upon indication that the amount of liquid comprises the predetermined volume; and
disposing of the liquid in the liquid reservoir portion.

* * * * *